(12) United States Patent
Yamaoka (10) Patent No.: US 10,036,890 B2
(45) Date of Patent: Jul. 31, 2018

(54) HEAD-UP DISPLAY DEVICE (71) Applicant: DENSO CORPORATION, Kariya, Aichi-pref. (JP)

(72) Inventor: Ryo Yamaoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 104 days.

(21) Appl. No.: 15/108,813

(22) PCT Filed: Mar. 26, 2015

(86) PCT No.: PCT/JP2015/001760
§ 371 (c)(1),
(2) Date: Jun. 29, 2016

(87) PCT Pub. No.: WO2015/182027
PCT Pub. Date: Dec. 3, 2015

(65) Prior Publication Data
US 2016/0327788 A1    Nov. 10, 2016

(30) Foreign Application Priority Data

May 26, 2014   (JP) .................................. 2014-108314

(51) Int. Cl.
*F21V 8/00* (2006.01)
*G02B 27/01* (2006.01)
(Continued)

(52) U.S. Cl.
CPC .......... *G02B 27/0101* (2013.01); *B60K 35/00* (2013.01); *G02B 27/0006* (2013.01); *G02B 27/0149* (2013.01); *G02F 1/13* (2013.01); *G02F 1/1335* (2013.01); *G02F 1/13362* (2013.01); *G02F 1/13363* (2013.01); (Continued)

(58) Field of Classification Search
CPC ................................................... G02B 27/0006
See application file for complete search history.

(56) References Cited

U.S. PATENT DOCUMENTS

| 2013/0106922 A1* | 5/2013 | Chen ................. G02F 1/133514 345/690 |
| 2013/0135748 A1 | 5/2013 | Sato et al. |
| 2014/0184996 A1 | 7/2014 | Matsushita et al. |

FOREIGN PATENT DOCUMENTS

| JP | H06000885 U | 1/1994 |
| JP | 2010113197 A | 5/2010 |

(Continued)

*Primary Examiner* — Kendrick Hsu
(74) *Attorney, Agent, or Firm* — Harness, Dickey & Pierce, P.L.C.

(57) ABSTRACT

A head-up display device includes: a light source that emits light source light; a first light polarizer that takes out a linearly polarized light from the light source light; a liquid crystal layer, in which a display pixel that displays a picture and a non-displaying pixel which does not display a picture are able to be switched from each other, a polarization direction of the display pixel and a polarization direction of the non-displaying pixel being different from each other; and a second light polarizer. A part of the light source light corresponding to the display pixel passes through the second light polarizer by prohibiting a light of an interception axis intersecting a transmission axis while a light of the transmission axis is made to pass through.

3 Claims, 5 Drawing Sheets (51) Int. Cl.
  *B60K 35/00*     (2006.01)
  *G02F 1/13*      (2006.01)
  *G02F 1/1335*    (2006.01)
  *G02F 1/13363*   (2006.01)
  *G02B 27/00*     (2006.01)

(52) U.S. Cl.
  CPC ............. *B60K 2350/1056* (2013.01); *B60K 2350/2052* (2013.01); *B60K 2350/921* (2013.01)

(56) References Cited

FOREIGN PATENT DOCUMENTS

| | | | | |
|---|---|---|---|---|
| JP | 2010152025 A | 7/2010 | | |
| JP | 2012047934 A | 3/2012 | | |
| JP | 2013057897 A | 3/2013 | | |
| WO | WO 2013035855 A1 * | 3/2013 | ......... | G02B 27/0101 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2015/001760 filed on Mar. 26, 2015 and published in Japanese as WO 2015/182027 A1 on Dec. 3, 2015. This application is based on and claims the benefit of priority from Japanese Patent Application No. 2014-108314 filed on May 26, 2014. The entire disclosures of all of the above applications are incorporated herein by reference.

TECHNICAL FIELD

The present disclosure relates to a head-up display device (hereafter, HUD device).

BACKGROUND ART

Conventionally, a HUD device is known, which is housed in a housing part of a mobile unit, and projects a picture on a projection surface of the mobile unit through an opening of the housing part. The HUD device displays a virtual image of the picture to be confirmed from an interior of the mobile unit. Patent Literature 1 discloses a HUD device including a polarizing plate as a first light polarizer bonded to a front surface of a liquid crystal layer of a liquid-crystal display by transmission illumination, and a polarizing plate as a second light polarizer bonded to a rear surface of the liquid crystal layer. Light source light emitted from the liquid-crystal display is a linearly polarized light. The light source light is ejected from a dustproof sheet made of translucent resin such as acrylics arranged at the opening of the housing part.

PRIOR ART LITERATURES

Patent Literature

Patent Literature 1: JP 2010-113197 A

SUMMARY OF INVENTION

However, the internal structure may be recognized from the exterior through the dustproof sheet made of the translucent resin, in the HUD device of Patent Literature 1. Moreover, the energy efficiency of light source light will get worse, because the light source light passes through the dustproof sheet made of translucent resin such as acrylics, which has transmissivity of about 92 to 93%. In order to solve the subject that the internal structure may be recognized, if the dustproof sheet is colored in a dark color, or if a half mirror is used, the transmissivity of the dustproof sheet relative to a display light further decreases. In this case, the energy efficiency of light source light gets worse further.

The energy efficiency of light source light means a ratio of energy of the light source light sighted from the interior of the mobile unit as a virtual image to energy of the light source light emitted.

It is an object of the present disclosure to provide a HUD device in which the energy efficiency of light source light is high while the internal structure is restricted from being seen from the exterior.

According to an aspect of the present disclosure, a head-up display device held in a housing part of a mobile unit to project a picture on a projection surface of the mobile unit through an opening of the housing part so as to display a virtual image of the picture to be confirmed from an interior of the mobile unit, includes: a light source that emits light source light; a first light polarizer; a liquid crystal layer; a light introducing part; and a second light polarizer. The first light polarizer takes out a linearly polarized light from the light source light. The liquid crystal layer is illuminated by the light source light from the first light polarizer, in which a display pixel that displays the picture and a non-displaying pixel which does not display the picture are able to be switched from each other. A polarization direction of the display pixel and a polarization direction of the non-displaying pixel are different from each other. The light introducing part introduces the light source light from the liquid crystal layer toward the projection surface. The second light polarizer intercepts a light of an interception axis intersecting a transmission axis while a light of the transmission axis is made to pass through such that a part of the light source light corresponding to the display pixel is made to pass through, and the second light polarizer closes the opening of the housing part.

The first light polarizer takes out the linearly polarized light from the light source light emitted from the light source. The polarization direction of the display pixel of the liquid crystal layer which displays a picture and the polarization direction of the non-displaying pixel which does not display a picture are made different relative to the light source light coming from the first light polarizer. The light source light corresponding to the display pixel passes through the second light polarizer. Thereby, a picture is formed by the light source light corresponding to the display pixel and passing through the second light polarizer, and can be projected onto the projection surface of a mobile unit. The picture can be displayed and recognized as a virtual image from the interior of the mobile unit. Moreover, since the second light polarizer that forms the picture is arranged as a dustproof sheet which closes the opening of the housing part, compared with a case where a second light polarizer and a dustproof sheet are prepared separately, the loss of energy can be reduced when the picture is displayed. Moreover, the second light polarizer arranged as a dustproof sheet allows a light of the transmission axis to pass through, and intercepts a light of the interception axis intersecting the transmission axis, such that a part of outdoor light is intercepted. Thus, the outdoor light is restricted from being reflected within the HUD device, and being again ejected out of the HUD device, such that the internal structure can be restricted from being seen from the exterior. Accordingly, the HUD device can be offered in which the energy efficiency of light source light is high while restricting the internal structure from being seen.

The head-up display device may further include a phase shifter formed to overlap with the second light polarizer, and the phase shifter adjusts a polarization state of the light source light by producing a phase difference.

The phase shifter formed to overlap with the second light polarizer adjusts the polarization state of light source light by producing a phase difference. Therefore, the second light polarizer and the phase shifter can be easily positioned, and a picture can be projected on the projection surface by the transmission of the light source light in the desired polarization state where the energy efficiency is optimized. Moreover, the HUD device can be manufactured easily by using a sheet for a television or the like.

DESCRIPTION OF EMBODIMENT

An embodiment is described based on the drawings.

Figure 1:
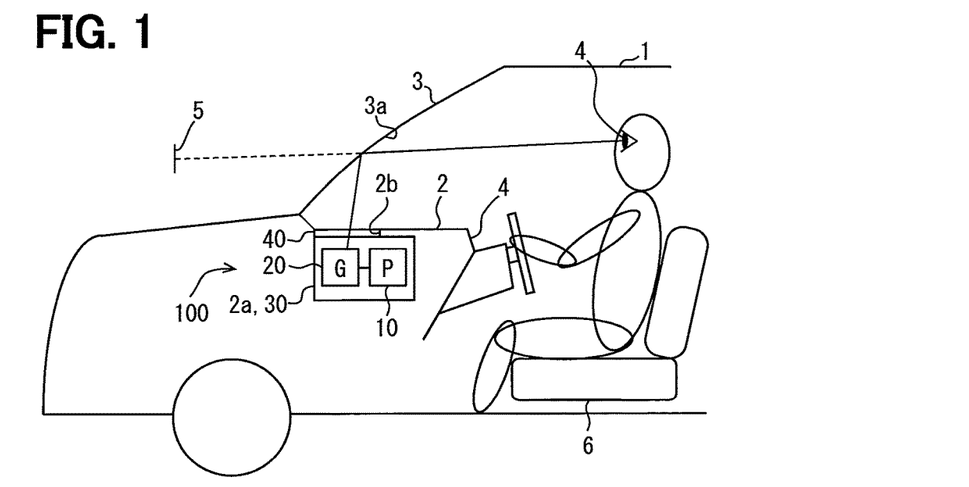
FIG. 1 is a schematic diagram illustrating a HUD device according to an embodiment, which is arranged in a vehicle.

As shown in FIG. 1, a head-up display device (HUD device) 100 is mounted to a vehicle 1 which is a mobile unit, and is received in a housing part 2a of a dark-colored instrument panel 2 of the vehicle 1. The housing part 2a is a space which holds the HUD device 100 in the instrument panel 2, and has an opening 2b adjacent to a windshield 3. The HUD device 100 projects a picture on the windshield 3 which is a display component of the vehicle 1 through the opening 2b of the housing part 2a.

In the vehicle 1, a projection surface 3a is defined on an interior surface of the windshield 3 to have a curved concave shape or a flat plane shape, and a picture is projected to the projection surface 3a. An angle difference may be defined between the interior surface and an exterior surface of the windshield 3, such that virtual images 5 formed by being reflected on the respective surfaces overlap with each other. The windshield 3 may have a film such as vapor deposition film on the interior surface, so as to reduce the luminosity of the virtual image 5 that is reflected on the exterior surface. Instead of the windshield 3, a combiner separable from the vehicle 1 may be arranged in the vehicle 1, and a picture may be projected on a projection surface of the combiner.

The HUD device 100 projects a picture on the projection surface 3a to be recognized for an occupant seated on a seat 6 of the vehicle 1 as the virtual image 5 inside the passenger compartment of the vehicle 1. That is, a light reflected on the projection surface 3a reaches an eye-point 4 of the occupant, and the occupant perceives the light which reaches the eye-point 4. Thus, the occupant can recognize road information, vehicle information including vehicle status such as speed or fuel residual quantity, or sight supplementary information.

The configuration of the HUD device 100 is explained based on FIGS. 2-9. The HUD device 100 includes a projection part 10, a light introducing part 20, a housing 30, and a dustproof sheet 40.

Figure 2:
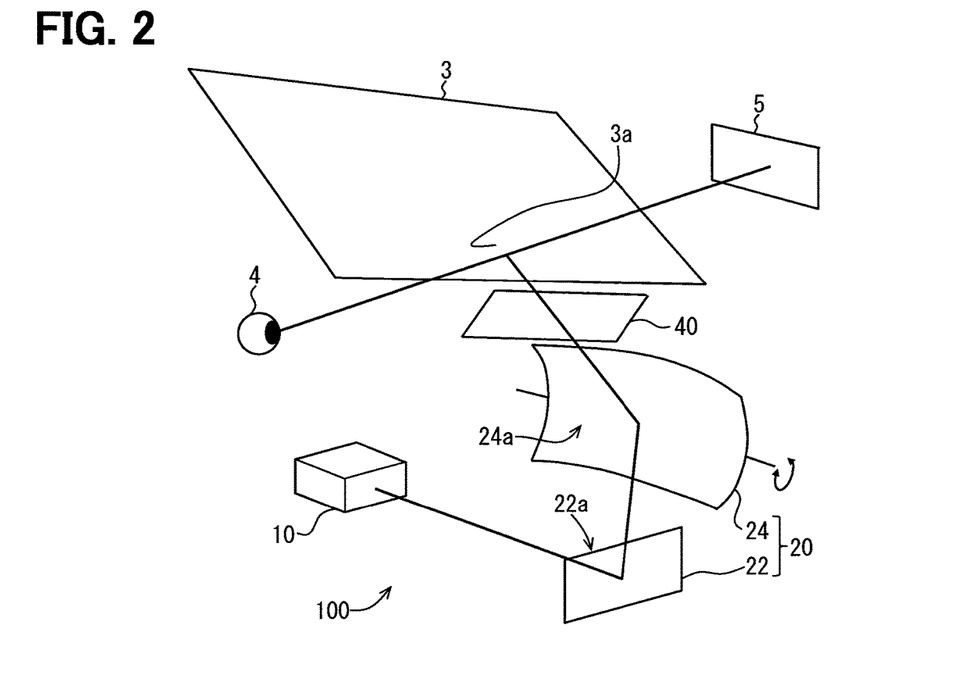
FIG. 2 is a schematic diagram illustrating an optical system of the HUD device in the embodiment.
Figure 3:
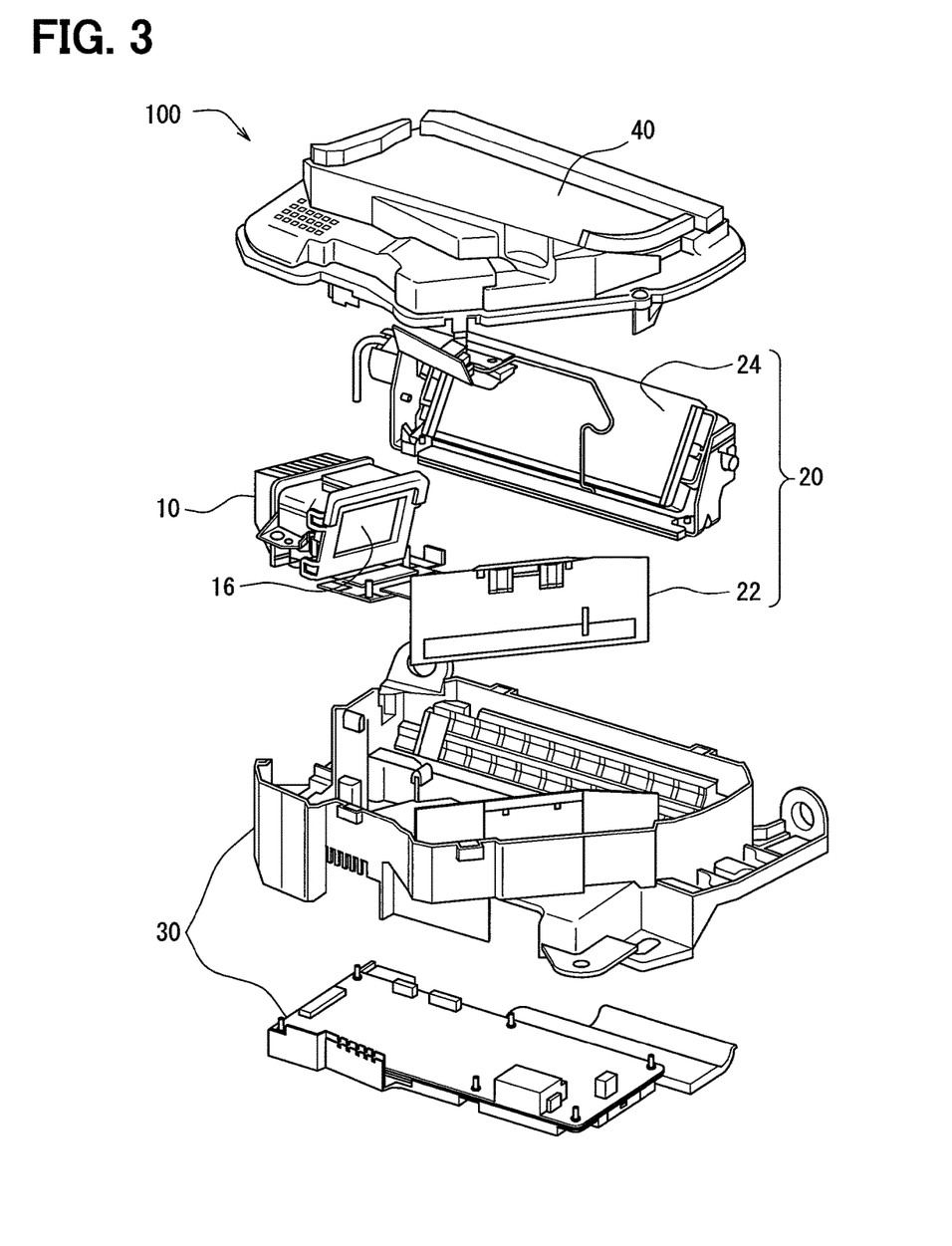
FIG. 3 is an exploded perspective view illustrating the HUD device of the embodiment.
Figure 4:
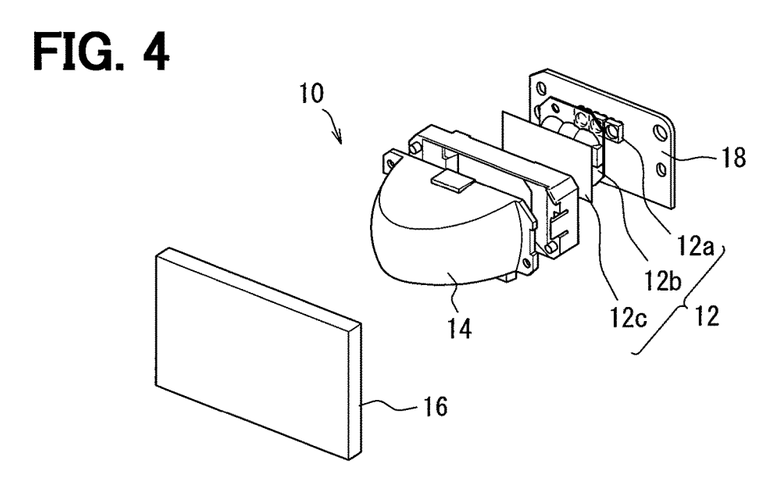
FIG. 4 is a perspective view illustrating a projection part in the embodiment.

As shown in FIGS. 2 and 3, the projection part 10 is a box-shape display portion. As shown in FIG. 4, the projection part 10 has a back light 12, a projection lens 14, and a liquid crystal panel 16.

The back light 12 has a light source 12a, a light gathering lens 12b, and a diffusion board 12c. The light source 12a may be a light emitting element such as light emitting diode, and is arranged on a circuit board 18 for light source. The light source 12a is electrically connected with a controller and a power supply (not shown) through a circuit pattern (not shown) on the circuit board 18. The light source 12a emits light source light according to the amount of current, and projects the light source light in the random polarization state toward the light gathering lens 12b. The light gathering lens 12b is a translucent convex lens made of synthetic resin or glass, and is arranged between the light source 12a and the diffusion board 12c. The light gathering lens 12b condenses the light source light coming from the light source 12a, and ejects the condensed light toward the diffusion board 12c. The diffusion board 12c is a semi-translucent or milk white board made of synthetic resin such as polycarbonate to which optical diffusion material is mixed, and is arranged between the light gathering lens 12b and the projection lens 14. The diffusion board 12c diffuses and ejects the light source light adjusted to have a uniform luminosity toward the projection lens 14.

The projection lens 14 is a translucent convex lens made of synthetic resin or glass, and is arranged between the back light 12 and the liquid crystal panel 16. The projection lens 14 condenses the light source light coming from the back light 12, and illuminates the liquid crystal panel 16.

Figure 5:
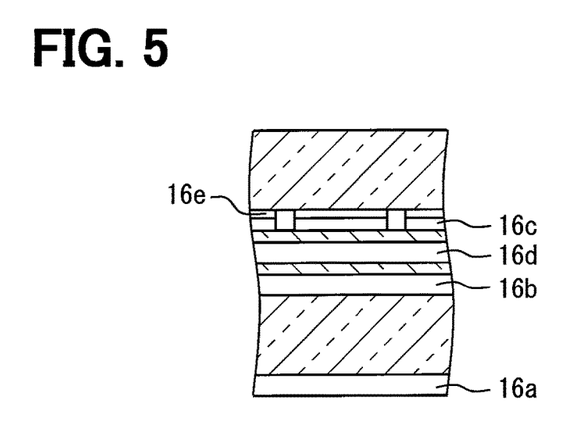
FIG. 5 is a schematic sectional view illustrating a part of a liquid crystal panel in the embodiment.

The liquid crystal panel 16 is a liquid crystal panel using a thin film transistor (TFT), for example, an active-matrix type liquid crystal panel in which plural liquid crystal pixels 17 are arranged in two dimensional directions. As shown in FIG. 5, the liquid crystal panel 16 has a polarizing plate 16a as a first light polarizer, a pair of transparent electrodes 16b and 16c, a liquid crystal layer 16d interposed between the pair of transparent electrodes 16b and 16c, and a color filter 16e which are stacked with each other.

The polarizing plate 16a has a plane shape which covers all the liquid crystal pixels 17. The polarizing plate 16a takes out linearly polarized light from the light source light in the random polarization state, which is illuminated through, for example, the projection lens 14, and ejects the linearly polarized light to enter the liquid crystal layer 16d.

The pair of transparent electrodes 16b and 16c are electrically connected with an external controller (not shown), and a voltage can be impressed between the electrodes 16b and 16c of each liquid crystal pixel 17 based on an electric signal output from the external controller.

Figure 6:
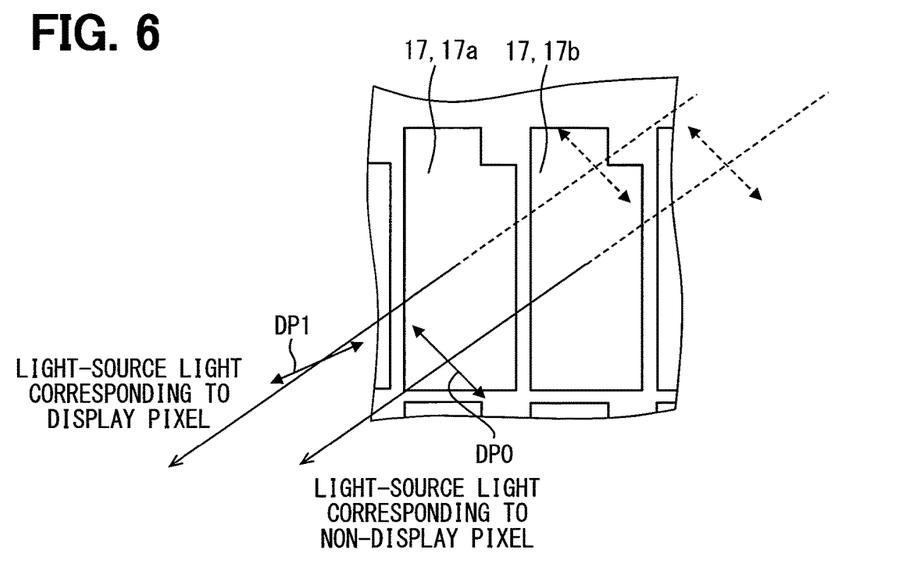
FIG. 6 is a schematic diagram explaining polarization directions of light source light passing through the liquid crystal layer in the embodiment.

The liquid crystal layer 16d is a layer filled with solution containing mainly liquid crystal molecules such as nematic liquid crystal. The orientation of the liquid crystal molecule in the liquid crystal layer 16d is controlled by the voltage impressed between the pair of transparent electrodes 16b and 16c, such that it is possible to change the polarization direction of the light source light incident into the liquid crystal layer 16d according to the voltage. As shown in FIG. 6, specifically, the polarization direction changes by 90 degrees, due to the light transmission in the liquid crystal layer 16d, in the display pixel 17a of the liquid crystal pixels 17 which displays a picture. In contrast, in the non-display pixel 17b of the liquid crystal pixels 17 which does not display a picture, the polarization direction has no change after the light passes through the liquid crystal layer 16d. Moreover, in each liquid crystal pixel 17, the display pixel 17a and the non-display pixel 17b are switched by controlling the voltage so as to correspond to the virtual image 5 to be displayed. Thus, the liquid crystal layer 16d is illuminated by light source light travelling from the polarizing plate 16a, in which the display pixel 17a and the non-display pixel 17b are arranged switchable, such that the polarization direction DP1 of the display pixel 17a and the polarization direction DP0 of the non-display pixel 17b are different from each other. In this embodiment, the polarization direction is a direction where an electric field vibrates in the light source light in the linearly polarized state.

In this embodiment adopting the active-matrix type, a drive system according to TN (Twisted Nematic) system in a conventional liquid crystal panel is adopted. Alternatively, a drive system according to VA (Vertical Alignment) system in a conventional liquid crystal panel or a drive system according to IPS (In-Place-Switching) system in a conventional liquid crystal panel may be adopted. Moreover, a passive-matrix type may be adopted.

The light source light passing through the liquid crystal layer 16d of the liquid crystal panel 16 is a linearly polarized light, and is projected to the light introducing part 20 after the polarization direction DP1 of the display pixel 17a and the polarization direction DP0 of the non-display pixel 17b are made different from each other.

As shown in FIGS. 2 and 3, the light introducing part 20 includes a plane mirror 22 and a concave mirror 24. The plane mirror 22 is formed by depositing aluminum vapor as a reflective surface 22a on the surface of the base material made of synthetic resin or glass. The reflective surface 22a has a smooth plane shape. The plane mirror 22 reflects the light source light from the liquid crystal panel 16 of the projection part 10 toward the concave mirror 24.

The concave mirror 24 is formed by depositing aluminum vapor as a reflective surface 24a on the surface of the base material made of synthetic resin or glass. The reflective surface 24a has a smooth curved shape as a concave surface recessed at the center of the concave mirror 24. The concave mirror 24 reflects the light source light from the plane mirror 22 toward the projection surface 3a through the opening 2b. Thus, the light introducing part 20 introduces light source light, in which the polarization direction DP1 of the display pixel 17a and the polarization direction DP0 of the non-display pixel 17b are made different by the liquid crystal layer 16d, toward the projection surface through the opening 2b.

The housing 30 is a case for receiving the projection part 10 and the light introducing part 20 fixed as a unit, in the housing part 2a of the vehicle 1. Moreover, the housing 30 holds the dustproof sheet 40 which closes the opening 2b at the position corresponding to the opening 2b of the housing part 2a.

Figure 7:
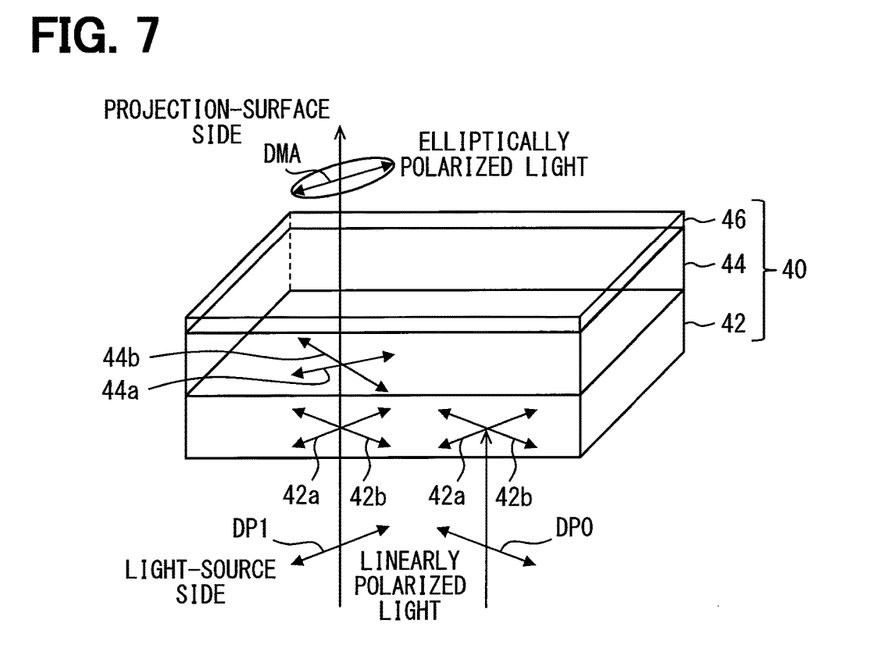
FIG. 7 is a schematic diagram explaining a dustproof sheet in the embodiment.

The dustproof sheet 40 closes the opening 2b of the housing part 2a. As shown in FIG. 7, the dustproof sheet 40 includes a polarizing plate 42 as a second light polarizer, a phase plate 44 as a phase shifter, and a hard coating layer 46 stacked with each other by bonding. In the dustproof sheet 40 of this embodiment, the polarizing plate 42 is located on the side of the light source 12a, and the phase plate 44 is located on the side of the projection surface 3a. The dustproof sheet 40 is edged with a dark-colored bezel 50 corresponding to the color of the dustproof sheet 40 at the opening 2b.

The polarizing plate 42 is arranged as the dustproof sheet 40. A light of a transmission axis 42a is allowed to pass through the polarizing plate 42, while a light of an interception axis 42b which intersects the transmission axis 42a is intercepted. The transmission axis 42a represents an axis where the transmissivity becomes the maximum when a light having the polarization direction that is along the transmission axis 42a is incident into the polarizing plate 42.

The interception axis 42b represents an axis where the transmissivity becomes the minimum when a light having the polarization direction that is along the interception axis 42b is incident into the polarizing plate 42.

The polarizing plate 42 of this embodiment has a sheet shape mainly made of film of, for example, polyvinyl alcohol to which iodine is added. Due to the orientation direction of iodine molecular, the transmission axis 42a and the interception axis 42b are approximately perpendicular to each other. The interception axis 42b of the polarizing plate 42 is an absorption axis where the light is absorbed. That is, when a light having a polarization direction that is along the interception axis 42b as an absorption axis is incident into the polarizing plate 42, the absorptivity becomes the maximum.

The polarizing plate 42 is arranged in a manner that the transmission axis 42a corresponds to the polarization direction DP1 of the display pixel 17a. Moreover, the polarizing plate 42 is arranged in a manner that the absorption axis corresponds to the polarization direction DP0 of the non-display pixel 17b. Of the light source light travelling from the liquid crystal layer 16d to the projection surface 3a through the light introducing part 20, the polarizing plate 42 allows the light source light corresponding to the display pixel 17a to pass through. Moreover, the polarizing plate 42 absorbs the light source light corresponding to the non-display pixel 17b. That is, a picture is formed by the light source light corresponding to the display pixel 17a and passing through the polarizing plate 42.

The phase plate 44 has a sheet shape, and controls the polarization state of the incident light source light by producing a phase difference. Concretely, a refractive index of the phase plate 44 is different between an advance axis 44a and a retard axis 44b which intersect with each other. In the incident light, the velocity of light component in alignment with the advance axis 44a in the phase plate 44 differs from the velocity of light component in alignment with the retard axis 44b in the phase plate 44. Therefore, a phase difference arises between the component in alignment with the advance axis 44a and the component in alignment with the retard axis 44b. As a result, the phase plate 44 can control the polarization state.

The light source light passing through the polarizing plate 42 and corresponding to the display pixel 17a is incident into the phase plate 44 in the state of linearly polarized light. The phase plate 44 is arranged in a manner that the advance axis 44a and the retard axis 44b are different from the polarization direction DP1 of the display pixel 17a and the transmission axis 42a of the polarizing plate 42, such that it is possible to control the polarization state of the light source light corresponding to the display pixel 17a.

Figure 8:
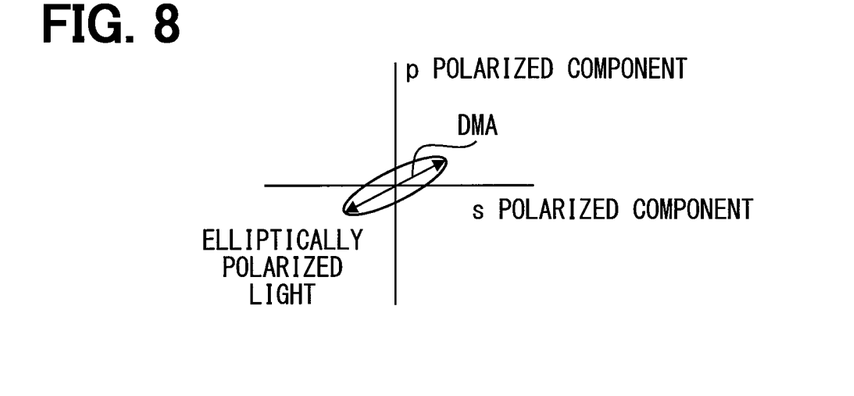
FIG. 8 is a schematic diagram illustrating a polarization state of light which is incident into a projection surface in the embodiment.

The phase plate 44 in this embodiment controls the polarization state so as to produce an elliptically polarized light. That is, the phase plate 44 converts the light source light corresponding to the display pixel 17a and being incident from the polarizing plate 42 into the elliptically polarized light, and ejects the elliptically polarized light toward the projection surface 3a. As shown in FIGS. 1, 2, and 8, a light which obliquely enters the projection surface 3a has both s-polarization component and p-polarization component relative to an entrance plane, because the phase plate 44 produces the elliptically polarized light. A direction DMA corresponding to a long axis of the elliptically polarized light is slanting to the entrance plane. The entrance plane is a plane which includes the incidence light and a direction of a normal to the projection surface 3a at the incidence part.

A reflectance of the s-polarization component becomes higher than a reflectance of the p-polarization component at the projection surface 3a. Therefore, it is desirable to enter the projection surface 3a in the polarization state where the s-polarization component increases, relative to an occupant without glasses. In contrast, even when the occupant wears polarization sunglasses, a part of the light (for example, corresponding to the p-polarization component) passes through the polarization sunglasses, because the light reflected by the projection surface 3a includes the p-polarization component. Therefore, by considering both of an occupant not wearing glasses and an occupant with polarization sunglasses, the direction DMA corresponding to a long axis of the elliptically polarized light is set to optimize the luminosity and the energy efficiency.

The hard coating layer 46 is made of translucent synthetic resin. The hard coating layer 46 is exposed at a position most adjacent to the projection surface 3a in the dustproof sheet 40, and prevents the dustproof sheet 40 from being damaged. The hard coating layer 46 is a thin film relative to the thickness of the polarizing plate 42 and the thickness of the phase plate 44, since it is not necessary to secure the strength for holding the dustproof sheet 40 only by the hard coating layer 46.

Since the interception axis 42b of the polarizing plate 42 intercepts light such as sunlight from entering the HUD device 100, the dustproof sheet 40 restricts the product life of the HUD device 100 from falling. The dustproof sheet 40 is sighted by an occupant as a dark color due to the interception of light corresponding to the interception axis 42b of the polarizing plate 42.

Figure 9:
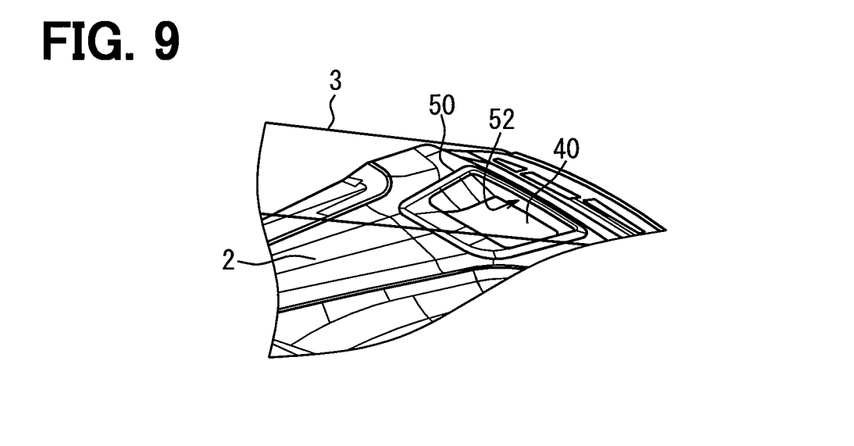
FIG. 9 is a perspective view illustrating a circumference of the dustproof sheet in the embodiment.

As shown in FIG. 9, the dustproof sheet 40 has a cylindrical surface shape in which the central part is curved to the internal side of the HUD device 100 as a concave in the state where the dustproof sheet 40 is inclined to the opposite side opposite from the seat 6 in the opening 2b. The curvature radius of this curve is set, for example, as 150 cm. Due to the dustproof sheet 40 with such a cylindrical surface shape, much of outdoor light that is incident into the dustproof sheet 40 and that is reflected by the hard coating layer 46 or the phase plate 44 enters a side surface part 52 of the bezel 50. The outdoor light is absorbed by the dark-colored side part 52.

The effects of this embodiment are explained below.

According to the embodiment, a linearly polarized light is taken out by the polarizing plate 16a as the first light polarizer from the light source light emitted from the light source 12a. The polarization direction DP1 of the display pixel 17a which displays a picture and the polarization direction DP0 of the non-display pixel 17b which does not display a picture are made different from each other by the liquid crystal layer 16d relative to the light source light coming from the polarizing plate 16a. The light source light corresponding to the display pixel 17a passes through the polarizing plate 42 as the second light polarizer. Thereby, a picture is formed by the penetration of the light source light corresponding to the display pixel 17a in the polarizing plate 42, and it becomes possible to project the picture on the projection surface 3a of the vehicle 1. The picture can be displayed as the virtual image 5 to be recognized from the interior of the vehicle 1. Moreover, since the polarizing plate 42 which forms the picture is arranged as the dustproof sheet 40 which closes the opening 2b of the housing part 2a, compared with a case where a polarizing plate for forming a picture and a dustproof sheet are separately prepared, the picture can be displayed by restricting loss of energy. Moreover, the polarizing plate 42 arranged as the dustproof sheet 40 intercepts a part of outdoor light, because the light of the interception axis 42b intersecting the transmission axis 42a is intercepted, while the light of the transmission axis 42a is allowed to pass through. Thus, the internal structure can be restricted from being seen from the exterior, which is caused by outdoor light reflected inside the device 100 and being again ejected out of the device 100. Accordingly, the HUD device 100 in which energy efficiency of light source light is better can be offered while restricting the internal structure from being seen.

According to this embodiment, the phase plate 44 of the dustproof sheet 40 formed with the polarizing plate 42 controls the polarization state of light source light by producing a phase difference. Therefore, it is easy for positioning the polarizing plate 42 and the phase plate 44, and a picture can be projected on the projection surface 3a by the penetration of the light source light in the desired polarization state where the energy efficiency is optimized. In case where a sheet currently used on television etc. can be used in this purpose, the HUD device 100 can be manufactured easily.

According to this embodiment, the polarization state is adjusted to produce the elliptically polarized light. Further, the polarizing plate 42 of the dustproof sheet is located adjacent to the light source 12a, and the phase plate 44 of the dustproof sheet is located adjacent to the projection surface 3a. Therefore, a picture is displayed as the virtual image 5 to be recognized in the state where the light source light is changed into the elliptically polarized light by the phase plate 44. When a person wearing polarization sunglasses leans the head, the luminosity of the virtual image 5 can be restricted from changing rapidly.

According to this embodiment, the interception axis 42b is an absorption axis which absorbs light. Accordingly, the internal structure can be restricted from being seen from the exterior, since the light source light corresponding to the non-display pixel 17b is restricted from being reflected by the polarizing plate 42, from being further reflected inside the device 100, and from being ejected out of the device 100.

According to this embodiment, the dustproof sheet 40 is edged by the dark-colored bezel 50 in the opening 2b. Therefore, a sense of togetherness can be produced by the dark-colored bezel 50 and the polarizing plate 42 of the dustproof sheet 40 sighted in the dark color by intercepting light.

While the embodiment of the present disclosure is described, the present disclosure is not restricted to the embodiment mentioned, and can be implemented with various modification in the range not deviating from the scope of the present disclosure.

As a first modification, the dustproof sheet 40 may not have the phase plate 44. For example, the dustproof sheet 40 may be formed only with the polarizing plate 42. Moreover, the dustproof sheet 40 may be formed by stacking the polarizing plate 42 and the hard coating layer 46.

As a second modification, the phase plate 44 may control the polarization state by changing only the polarization direction of the light source light in the linearly polarized state. As a third modification in this case, in the dustproof sheet 40, the phase plate 44 may be located adjacent to the light source, and the polarizing plate 42 may be located adjacent to the projection surface 3a.

As a fourth modification, the phase plate 44 may convert the linearly polarized light into a circular polarized light by controlling the polarization state.

As a fifth modification, the dustproof sheet 40 may not be edged by the dark-colored bezel 50 in the opening 2b.

As a sixth modification, the HUD device 100 may be applied to various mobile units (transport machines) such as vessel or airplane other than the vehicle 1.

What is claimed is:

1. A head-up display device held in a housing part of a mobile unit to project a picture on a projection surface of the mobile unit through an opening of the housing part so as to display a virtual image of the picture to be confirmed from an interior of the mobile unit, the head-up display device comprising:
    a light source that emits light source light;
    a first light polarizer that takes out a linearly polarized light from the light source light;
    a liquid crystal layer illuminated by the light source light travelling from the first light polarizer, in which a display pixel that displays the picture and a non-display pixel which does not display the picture are able to be switched from each other, a polarization direction of the display pixel and a polarization direction of the non-display pixel being different from each other;
    a light introducing part that introduces the light source light from the liquid crystal layer toward the projection surface, the light introducing part having a reflective surface that reflects the light source light, wherein the light introducing part having the reflective surface is located between the first light polarizer and a second light polarizer in a path of the light source light, and is housed in the housing part;
    the second light polarizer intercepts a light of an interception axis intersecting a transmission axis while a light of the transmission axis is made to pass through such that a part of the light source light corresponding to the display pixel is made to pass through, wherein the second light polarizer is arranged as a dustproof sheet that closes the opening of the housing part; and
    a phase shifter arranged to overlap with the second light polarizer as the dustproof sheet, wherein
    the phase shifter controls a polarization state of the light source light by producing a phase difference,
    the phase shifter controls the light source light to be an elliptically polarized light by controlling the polarization state,
    the second light polarizer of the dustproof sheet is located adjacent to the light source, and
    the phase shifter of the dustproof sheet is located adjacent to the projection surface.

2. The head-up display device according to claim 1, wherein
    the interception axis is an absorption axis which absorbs light.

3. The head-up display device according to claim 1, wherein
    the dustproof sheet is edged by a dark-colored bezel in the opening.

* * * * *